(12) United States Patent
Suhar et al.

(10) Patent No.: US 9,763,519 B1
(45) Date of Patent: Sep. 19, 2017

(54) SELF-SUPPORTING FENCE OR BALUSTER SHELF BRACKET

(71) Applicants: Wayne Suhar, Lake Worth, FL (US); Michael Rochford, Lake Worth, FL (US)

(72) Inventors: Wayne Suhar, Lake Worth, FL (US); Michael Rochford, Lake Worth, FL (US)

( * ) Notice: Subject to any disclaimer, the term of this patent is extended or adjusted under 35 U.S.C. 154(b) by 0 days.

(21) Appl. No.: 15/090,685

(22) Filed: Apr. 5, 2016

(51) Int. Cl.
*A47B 96/06* (2006.01)
*E04H 17/14* (2006.01)
*A47F 5/00* (2006.01)

(52) U.S. Cl.
CPC .......... *A47B 96/068* (2013.01); *A47B 96/061* (2013.01); *A47F 5/0043* (2013.01); *E04H 17/14* (2013.01)

(58) Field of Classification Search
USPC ....................................... 248/219.4
See application file for complete search history.

(56) References Cited

U.S. PATENT DOCUMENTS

| | | | | |
|---|---|---|---|---|
| 2,605,074 A | * | 7/1952 | Bucsko | E04G 5/06 182/187 |
| 3,148,857 A | * | 9/1964 | Hutchison | E04G 5/06 108/135 |
| 3,473,774 A | * | 10/1969 | Riblet | A47B 57/56 182/146 |
| 3,970,277 A | * | 7/1976 | Riblet | E04G 1/20 182/136 |
| 4,368,800 A | * | 1/1983 | Campbell | E04G 1/15 182/133 |
| 4,415,137 A | * | 11/1983 | Garves | F16M 11/041 211/86.01 |
| 5,257,766 A | * | 11/1993 | Riblet | A61K 47/48546 108/108 |
| 5,443,234 A | | 8/1995 | Woods | |
| D369,293 S | | 4/1996 | Gusdorf | |
| 5,535,974 A | | 7/1996 | Savitski | |
| 5,941,486 A | | 8/1999 | Riblet | |
| 6,209,837 B1 | * | 4/2001 | Harms | A47B 57/567 248/210 |
| 6,439,522 B1 | * | 8/2002 | Yeh | A47B 96/061 248/228.6 |

(Continued)

FOREIGN PATENT DOCUMENTS

WO 2005001220 A1 1/2005

*Primary Examiner* — Monica Millner
(74) *Attorney, Agent, or Firm* — Kyle A. Fletcher, Esq.

(57) ABSTRACT

The self-supporting fence or baluster shelf bracket is a device that is adapted to attach onto and support itself perpendicularly with respect to a fence picket or baluster. Moreover, the self-supporting fence or baluster shelf bracket is adapted to interface with the fence picket or baluster provided the fence picket or baluster is vertically oriented. The self-supporting fence or baluster shelf bracket includes a shelf-supporting arm and a back support member that are parallel with one another, and translate relative to one another via a pair of lever arms. Installed, the fence picket or baluster is adapted to be sandwiched between the shelf-supporting arm and the back support member. The shelf-supporting arm is elongated and able to receive and support a shelf member thereon and at a perpendicular orientation with respect to the fence picket or baluster.

12 Claims, 5 Drawing Sheets

(56) References Cited

U.S. PATENT DOCUMENTS

| | | | |
|---|---|---|---|
| 7,152,835 B1* | 12/2006 | Riblet | E04G 1/20 |
| | | | 248/235 |
| 7,204,345 B2* | 4/2007 | Grant | E04G 1/20 |
| | | | 182/82 |
| 7,258,197 B1 | 8/2007 | Wicks | |
| 7,475,856 B2* | 1/2009 | Riblet | A47B 57/567 |
| | | | 182/136 |
| 1,299,176 A1 | 2/2010 | Girard | |
| 7,712,716 B2* | 5/2010 | Riblet | E04G 1/20 |
| | | | 248/235 |
| 7,823,852 B1 | 11/2010 | Reno | |
| 2006/0180724 A1* | 8/2006 | Beaudry | A47G 7/044 |
| | | | 248/219.4 |

\* cited by examiner

SELF-SUPPORTING FENCE OR BALUSTER SHELF BRACKET

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of shelf brackets, more specifically, a shelf bracket that is adapted to secure itself against a fence or baluster.

SUMMARY OF INVENTION

The self-supporting fence or baluster shelf bracket is a device that is adapted to attach onto and support itself perpendicularly with respect to a fence picket or baluster. Moreover, the self-supporting fence or baluster shelf bracket is adapted to interface with the fence picket or baluster provided the fence picket or baluster is vertically oriented. The self-supporting fence or baluster shelf bracket includes a shelf-supporting arm and a back support member that are parallel with one another, and translate relative to one another via a pair of lever arms. A spring attaches between the pair of lever arms to provide a compressive force that draws the shelf-supporting arm and the back support member together. Installed, the fence picket or baluster is adapted to be sandwiched between the shelf-supporting arm and the back support member. The shelf-supporting arm is elongated and able to receive and support a shelf member thereon and at a perpendicular orientation with respect to the fence picket or baluster. The shelf member and applicable load provide a bending moment force that is countered via the collaboration of the fence picket or baluster, the back support member and the pair of lever arms. The lever arms provide a counter bending moment that helps to secure the self-supporting fence or baluster shelf bracket in place on the fence picket or baluster.

These together with additional objects, features and advantages of the self-supporting fence or baluster shelf bracket will be readily apparent to those of ordinary skill in the art upon reading the following detailed description of the presently preferred, but nonetheless illustrative, embodiments when taken in conjunction with the accompanying drawings.

In this respect, before explaining the current embodiments of the self-supporting fence or baluster shelf bracket in detail, it is to be understood that the self-supporting fence or baluster shelf bracket is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the self-supporting fence or baluster shelf bracket.

It is therefore important that the claims be regarded as including such equivalent construction insofar as they do not depart from the spirit and scope of the self-supporting fence or baluster shelf bracket. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
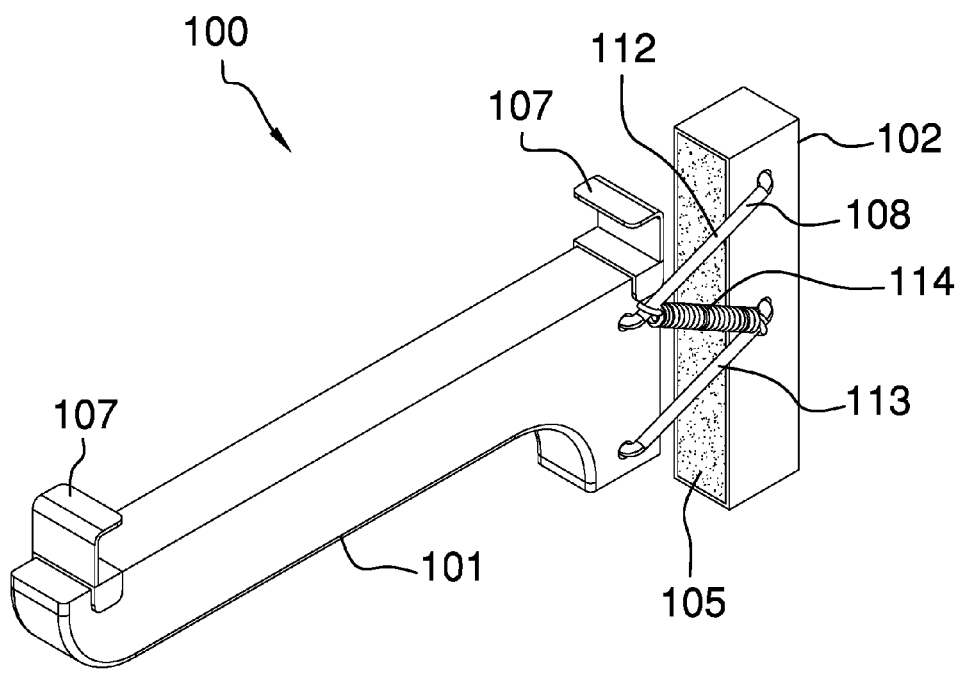
FIG. 1 is a perspective view of an embodiment of the disclosure.
Figure 2:
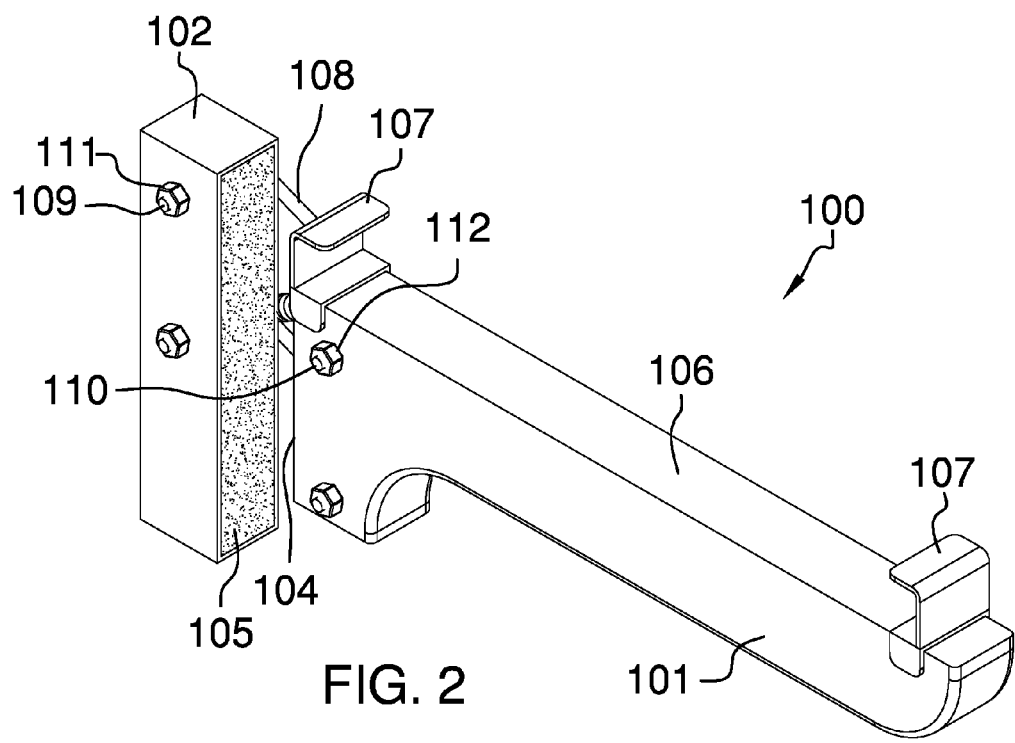
FIG. 2 is another perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a plurality potential embodiments of the disclosure, which are illustrated in FIGS. 1 through 5.

The self-supporting fence or baluster shelf bracket 100 (hereinafter invention) comprises a shelf-supporting arm 101 and a back support member 102. The shelf-supporting arm 101 and the back support member 102 are adapted to sandwich a fence picket or baluster 200 there between. The shelf-supporting arm 101 extends perpendicularly away from the fence picket or baluster 200 in order to support at least one shelf board 103 thereon. In use, the invention 100 is able to support the at least one shelf board 103 at a perpendicular orientation with respect to the fence picket or baluster 200 and a fence 201.

As a side note, the invention 100 is adapted for use with the fence 201. The term fence 201 may be more broadly used to determine a handrail along a stairway or walkway. It shall be duly noted that the invention 100 may be utilized in other environments aside of a traditional picket fence. Handrails provided along a walkway or stairs may also be utilized, and shall fall within the purview of applicable uses of the invention 100.

The shelf-supporting arm 101 is further defined with a rear, shelf surface 104. The back support member 102 is further defined with a front, back surface 105. The rear, shelf surface 104 of the shelf-supporting arm 101 is adapted to interface with a first picket or baluster surface 202 of the fence picket or baluster 200; whereas the front, back surface 105 of the back support member 102 is adapted to interface with a second picket or baluster surface 203 of the fence picket or baluster 200. The first picket or baluster surface 202 is opposite the second picket or baluster surface 203.

The shelf-supporting arm 101 is further defined with a top shelf surface 106 atop of which the at least one shelf board 103 rests. Shelf board brackets 107 are provided on distal ends of the top shelf surface 106. The shelf board brackets 107 help to secure the at least one shelf board 103 atop of the shelf-supporting arm 101.

The shelf-supporting arm 101 is affixed and translates with respect to the back support member 102. Moreover, at least one lever arm 108. The at least one lever arm 108 is pivotably attached to the shelf-supporting arm 101 as well as the back support member 102. The at least one lever arm 108 is a "U" shaped bracket further defined with a first lever end 109 and a second lever end 110. The first lever end 109 is threaded and is secured to the back support member 102 via a first threaded nut 111. The second lever end 110 is threaded and is secured to the shelf-supporting arm 101 via a second threaded nut 112. The at least one lever arm 108 ensures that the shelf-supporting arm 101 and the back support member 102 are parallel with one another in order to adaptively sandwich the fence picket or baluster 200 there between.

The invention 100 as depicted in the figures, shows the at least one lever arm 108 as a pair, and being further defined as a first lever arm 112 and a second lever arm 113. The first lever arm 112 is parallel with and positioned above the second lever arm 113. A spring 114 is connected between the first lever arm 112 and the second lever arm 113 in order to bias the back support member 102 to the shelf-supporting arm 101. The spring 114 helps to prevent over-rotation of the first lever arm 112 and the second lever arm 113 with respect to the shelf-supporting arm 101 and the back support member 102.

Figure 3:
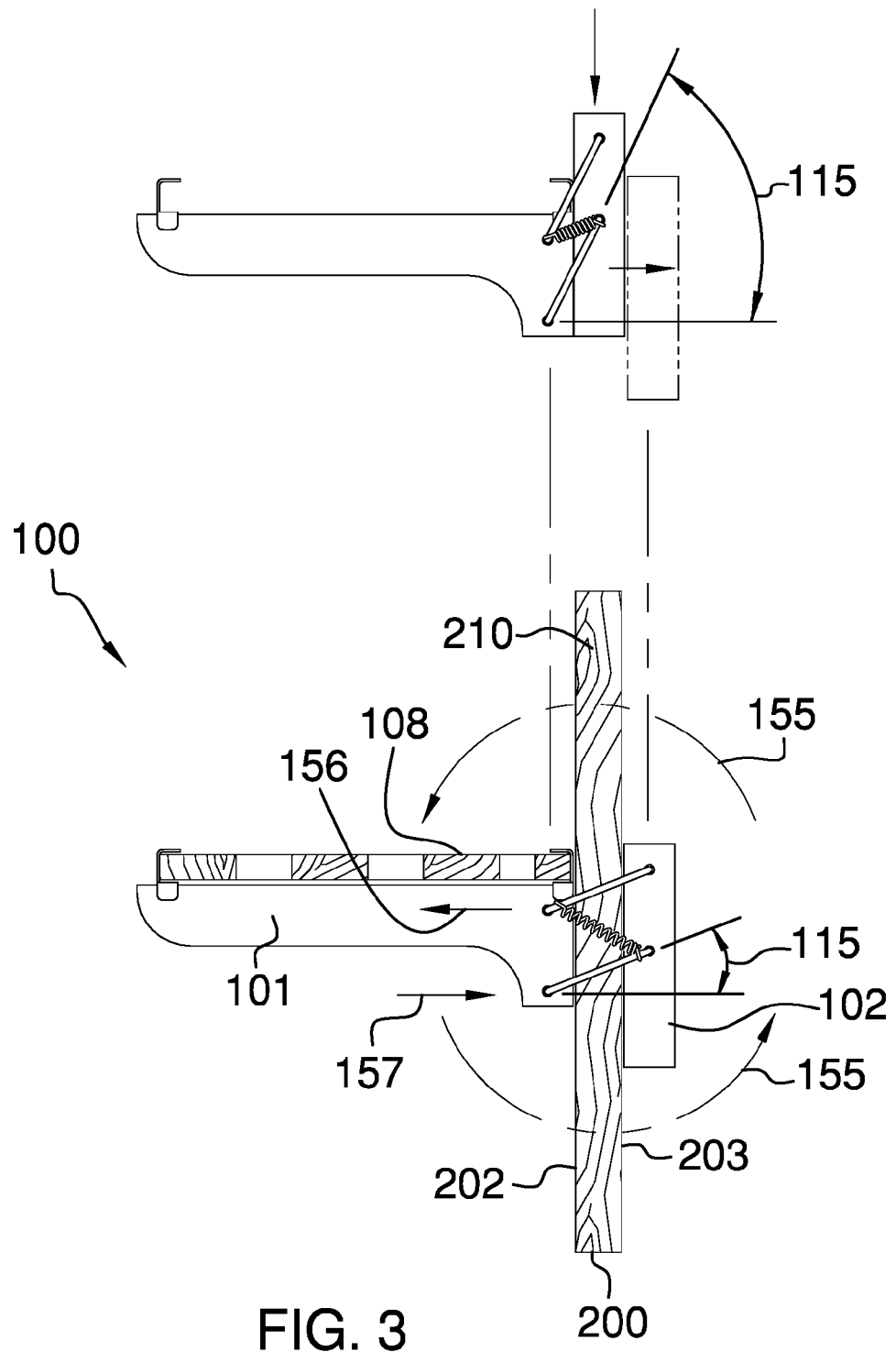
FIG. 3 is a side view of an embodiment of the disclosure.

Referring to FIG. 3, both the first lever arm 112 and the second lever arm 113 form an angle 115 with the at least one shelf board 103. The angle 115 increases when the invention 100 is not in use with the fence picket or baluster 200 via the spring 114.

In use, the invention 100 secures itself onto the fence picket or baluster 200 by utilizing a bending moment 155 about the fence picket or baluster 200. The bending moment 155 applies a tensile force 156 onto the first lever arm 112 in order to pull the back support member 102 towards the shelf-supporting arm 101. Moreover, the bending moment 155 generates a compressive force 157 onto the second lever arm 113 in order to push the shelf-supporting arm 101 towards the fence picket or baluster 200. The bending moment 155 is increased upon addition of an object 300 onto the at least one shelf board 103 (see FIG. 5).

It shall be noted that the first lever arm 112 and the second lever arm 113 are adapted to interface against an inner picket or baluster surface 210 of the fence picket or baluster 200. The inner picket or baluster surface 210 is adjacent the first picket or baluster surface 202 and the second picket or baluster surface 203. The back support member 102 is ideally a rectangular block; whereas the shelf-supporting arm 101 may have a curved edge and is generally elongated. Moreover, the shelf-supporting arm 101 is generally perpendicular with respect to the back support member 102.

Figure 4:
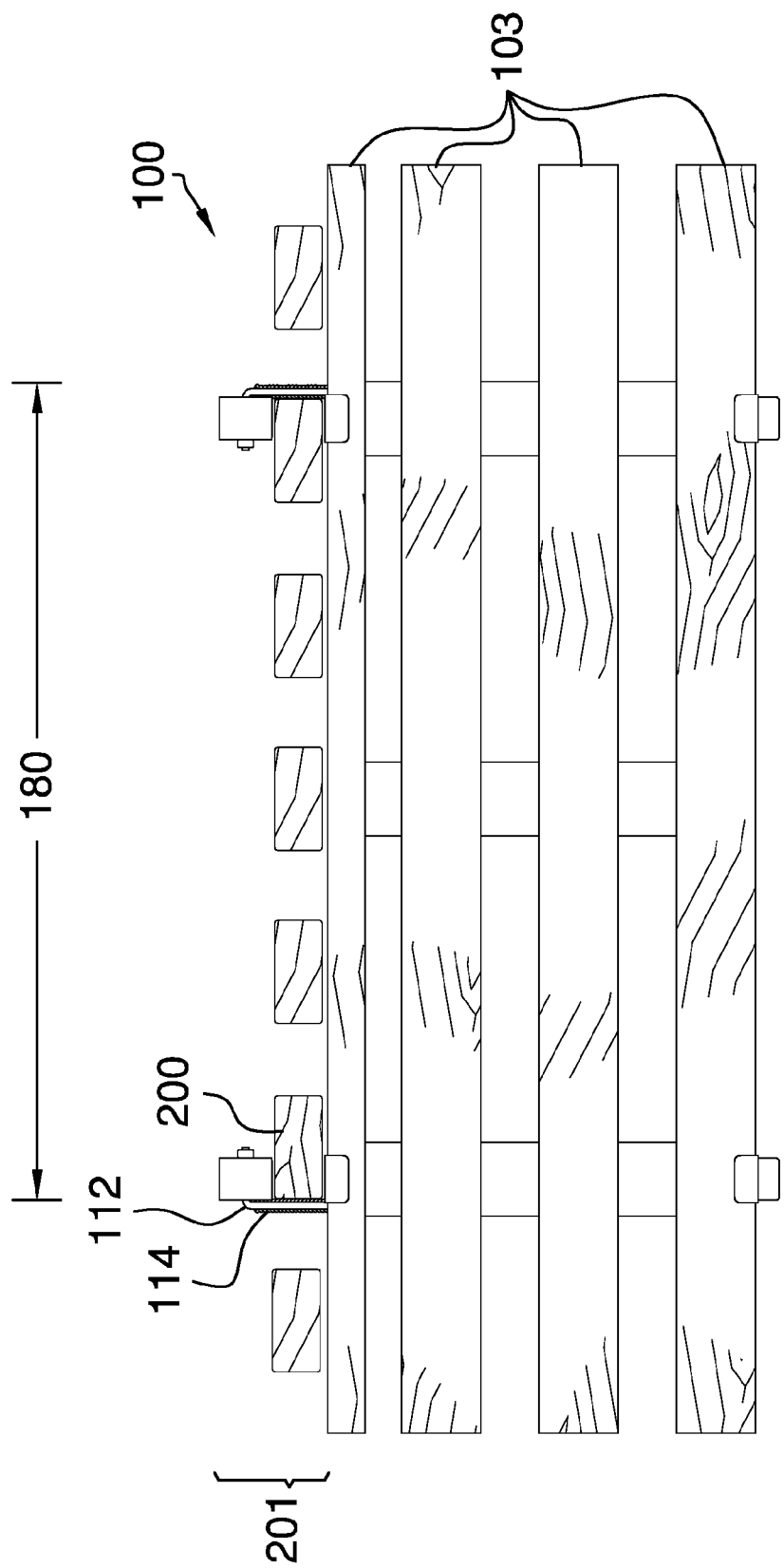
FIG. 4 is a top view of an embodiment of the disclosure.
Figure 5:
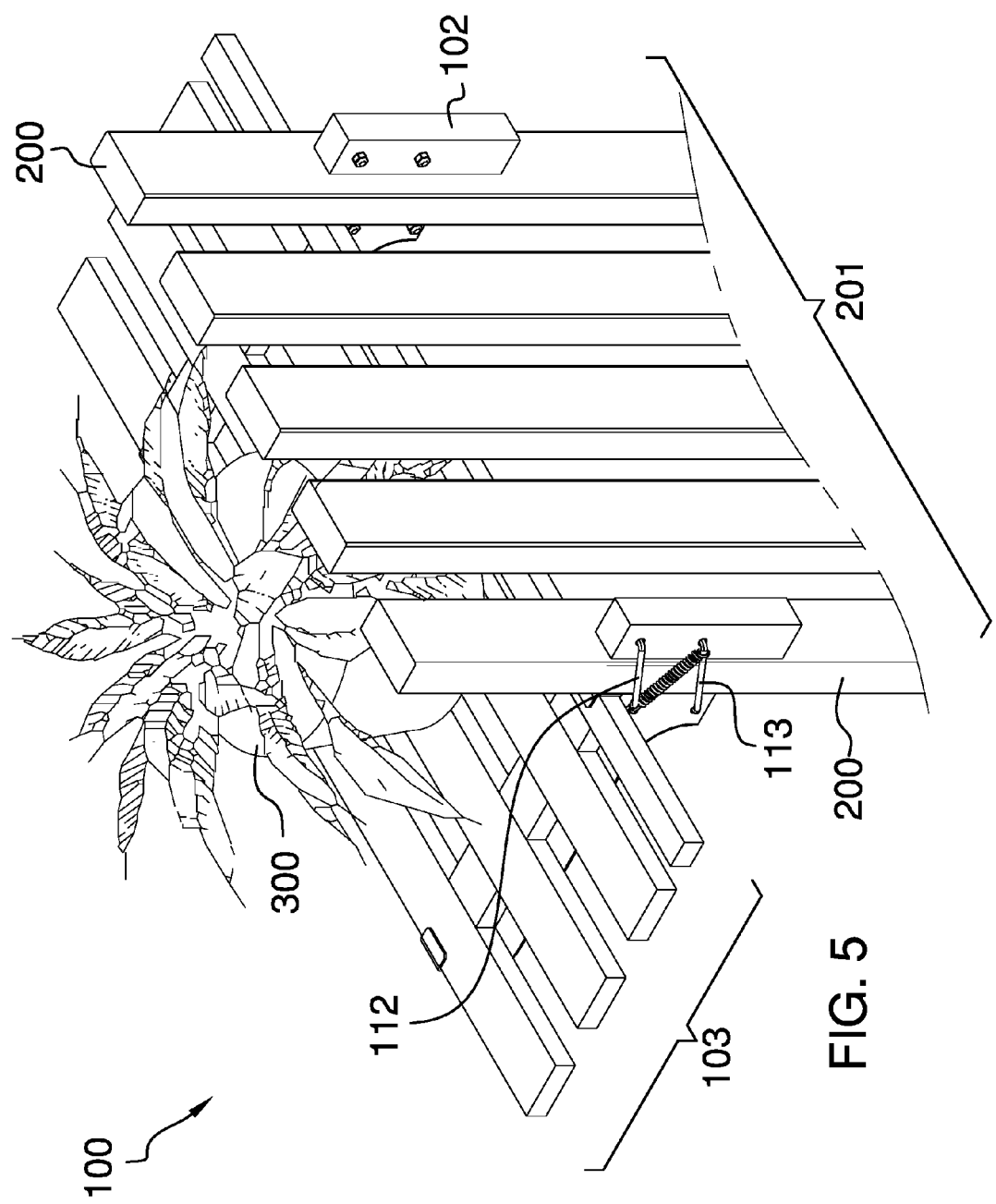
FIG. 5 is a perspective view of an embodiment of the disclosure in use.

Referring to FIG. 4, the invention 100 may utilize a pair of back support members 102 as well as a pair of the shelf-supporting arms 101. A distance 180 spans between the pair of back support members 102 as well as the pair of the shelf-supporting arms 101. The distance 180 enables the at least one shelf board 103 to span across the distance 180 in order to support the object 300 thereon.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

We claim:

1. A self-supporting fence or baluster shelf bracket comprising:

a back support member and a shelf-supporting arm that are adapted to collectively sandwich a fence picket or baluster there between;

wherein at least one lever arm is pivotably attached to the back support member and the shelf-supporting arm in order to adaptively secure the back support member and the shelf-supporting arm with respect to the fence picket or baluster;

wherein at least one shelf board is affixed to the shelf-supporting arm in order to adaptively support an object thereon;

wherein the shelf-supporting arm extends perpendicularly away from the fence picket or baluster in order to support the at least one shelf board thereon;

wherein the at least one shelf board is adapted to be at a perpendicular orientation with respect to the fence picket or baluster and the fence;

wherein the shelf-supporting arm is further defined with a rear, shelf surface;

wherein the back support member is further defined with a front, back surface;

wherein the rear, shelf surface of the shelf-supporting arm is adapted to interface with a first picket or baluster surface of the fence picket or baluster;

wherein the front, back surface of the back support member is adapted to interface with a second picket or baluster surface of the fence picket or baluster;

wherein the first picket or baluster surface is opposite the second picket or baluster surface;

wherein the shelf-supporting arm is further defined with a top shelf surface atop of which the at least one shelf board rests;

wherein shelf board brackets are provided on distal ends of the top shelf surface;

wherein the shelf board brackets help to secure the at least one shelf board atop of the shelf-supporting arm;

wherein the shelf-supporting arm is affixed and translates with respect to the back support member;

wherein the at least one lever arm is pivotably attached to the shelf-supporting arm as well as the back support member;

wherein the at least one lever arm is a "U" shaped bracket further defined with a first lever end and a second lever end.

2. The self-supporting fence or baluster shelf bracket according to claim 1 wherein a pair of back support members and the shelf-supporting arms is used to adaptively span a distance along a fence in order to support the at least one shelf board along with said object thereon.

3. The self-supporting fence or baluster shelf bracket according to claim 1 wherein the first lever end is threaded and is secured to the back support member via a first threaded nut; wherein the second lever end is threaded and is secured to the shelf-supporting arm via a second threaded nut; wherein the at least one lever arm ensures that the shelf-supporting arm and the back support member are parallel with one another in order to adaptively sandwich the fence picket or baluster there between.

4. The self-supporting fence or baluster shelf bracket according to claim 3 wherein the at least one lever arm is a pair of lever arms that is further defined as a first lever arm and a second lever arm.

5. The self-supporting fence or baluster shelf bracket according to claim 4 wherein the first lever arm is parallel with and positioned above the second lever arm.

6. The self-supporting fence or baluster shelf bracket according to claim 5 wherein a spring is connected between the first lever arm and the second lever arm in order to bias the back support member to the shelf-supporting arm.

7. The self-supporting fence or baluster shelf bracket according to claim 6 wherein both the first lever arm and the second lever arm form an angle with the at least one shelf board; wherein the angle increases via the spring when the self-supporting fence or baluster shelf bracket is not in use with the fence picket or baluster.

8. The self-supporting fence or baluster shelf bracket according to claim 7 wherein a bending moment is adapted to be formed about the fence picket or baluster.

9. The self-supporting fence or baluster shelf bracket according to claim 8 wherein the bending moment applies a tensile force onto the first lever arm in order to pull the back support member towards the shelf-supporting arm.

10. The self-supporting fence or baluster shelf bracket according to claim 9 wherein the bending moment generates a compressive force onto the second lever arm in order to push the shelf-supporting arm towards the fence picket or baluster.

11. The self-supporting fence or baluster shelf bracket according to claim 10 wherein the first lever arm and the second lever arm are adapted to interface against an inner picket or baluster surface of the fence picket or baluster; wherein the inner picket or baluster surface is adjacent the first picket or baluster surface and the second picket or baluster surface.

12. The self-supporting fence or baluster shelf bracket according to claim 11 wherein the back support member is a rectangular block; wherein the shelf-supporting arm is generally perpendicular with respect to the back support member.

\* \* \* \* \*